(12) United States Patent
Lim et al.

(10) Patent No.: US 7,014,492 B1
(45) Date of Patent: Mar. 21, 2006

(54) WIRELESS CIRCUIT ASSEMBLY AND APPARATUS FOR SECURING CARD EDGE CONNECTORS THEREIN

(75) Inventors: Hui-Leng Lim, Newark, CA (US); Patrick Wallace, San Jose, CA (US); Michael Suekawa, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/001,542

(22) Filed: Nov. 30, 2004

(51) Int. Cl.
*H01R 12/00* (2006.01)
*H01R 1/00* (2006.01)
*H01R 13/62* (2006.01)

(52) U.S. Cl. .................. 439/367; 439/326; 439/331

(58) Field of Classification Search ............. 439/65, 439/326, 331, 367, 366, 368; 361/658, 679, 361/680, 684, 720
See application file for complete search history.

(56) References Cited

U.S. PATENT DOCUMENTS

| | | | | |
|---|---|---|---|---|
| 5,547,397 A | * | 8/1996 | Hirai | 439/607 |
| 5,603,629 A | * | 2/1997 | DeFrasne et al. | 439/331 |
| 6,146,195 A | * | 11/2000 | Chang | 439/541.5 |
| 6,241,545 B1 | * | 6/2001 | Bricaud et al. | 439/326 |

* cited by examiner

*Primary Examiner*—Chandrika Prasad
(74) *Attorney, Agent, or Firm*—Fay Kaplun & Marcin, LLP

(57) ABSTRACT

Described is a circuit assembly including a circuit board including a connector, a card connectable to the connector and an apparatus securing the card to the connector, wherein the apparatus includes a front portion in substantially close contact with the card and a back portion in substantially close contact with the card, the apparatus being coupled to the circuit board.

19 Claims, 3 Drawing Sheets

WIRELESS CIRCUIT ASSEMBLY AND APPARATUS FOR SECURING CARD EDGE CONNECTORS THEREIN

BACKGROUND INFORMATION

A wireless device, such as a wireless personal data assistant, may transmit and receive data via a wireless network (e.g., an 802.11 wireless LAN network). The wireless device may include a removable Peripheral Component Interconnect ("PCI") card or an internal Mini PCI (e.g., Mini PCI radio) to enable connection to the wireless network. Use of a Mini PCI is favorable in smaller systems in which standard PCI expansion cards cannot be used due to mechanical system design constraints.

Today, a large percentage of the 802.11a/b/g radios are designed in the Mini-PCI format because of its reduced size, high performance, modularity and lower cost. Mini PCI standards have been created to promote portability of the radios between host systems and permits world wide regulatory agencies to approve the radios independent of the host systems. The Mini PCI standard includes several form factors including Type I, II and III, wherein type III is the most common. The Type III Mini PCI card generally mates with a 124-pin card edge type connector that is similar to the SO-DIMM type.

Existing connections of the card edge connectors, although adequate in electrical performance, often do not make a robust mechanical connection. A small movement of the card (e.g., a shock or vibration) may cause the radio card to lose electrical connections to the wireless device.

SUMMARY OF INVENTION

A circuit assembly including a circuit board including a connector, a card connectable to the connector and an apparatus securing the card to the connector, wherein the apparatus includes a front portion in substantially close contact with the card and a back portion in substantially close contact with the card, the apparatus being coupled to the circuit board.

In addition, an apparatus having a top portion and a front portion meeting the top portion at an angle substantially equal to ninety degrees, the front portion coming in substantially close contact with a card. The apparatus also has a back portion meeting the top portion at an angle greater than ninety degrees, the back portion coming in substantially close contact with the card to secure the card to a connector.

DETAILED DESCRIPTION

The present invention relates to a circuit assembly and apparatus for securing a card with an edge connector to a card edge connector located on a host circuit board. The present invention may be useful for securing cards with edge connectors (e.g., Mini PCI ("Peripheral Component Interconnect")) in a portable wireless device.

Figure 1:
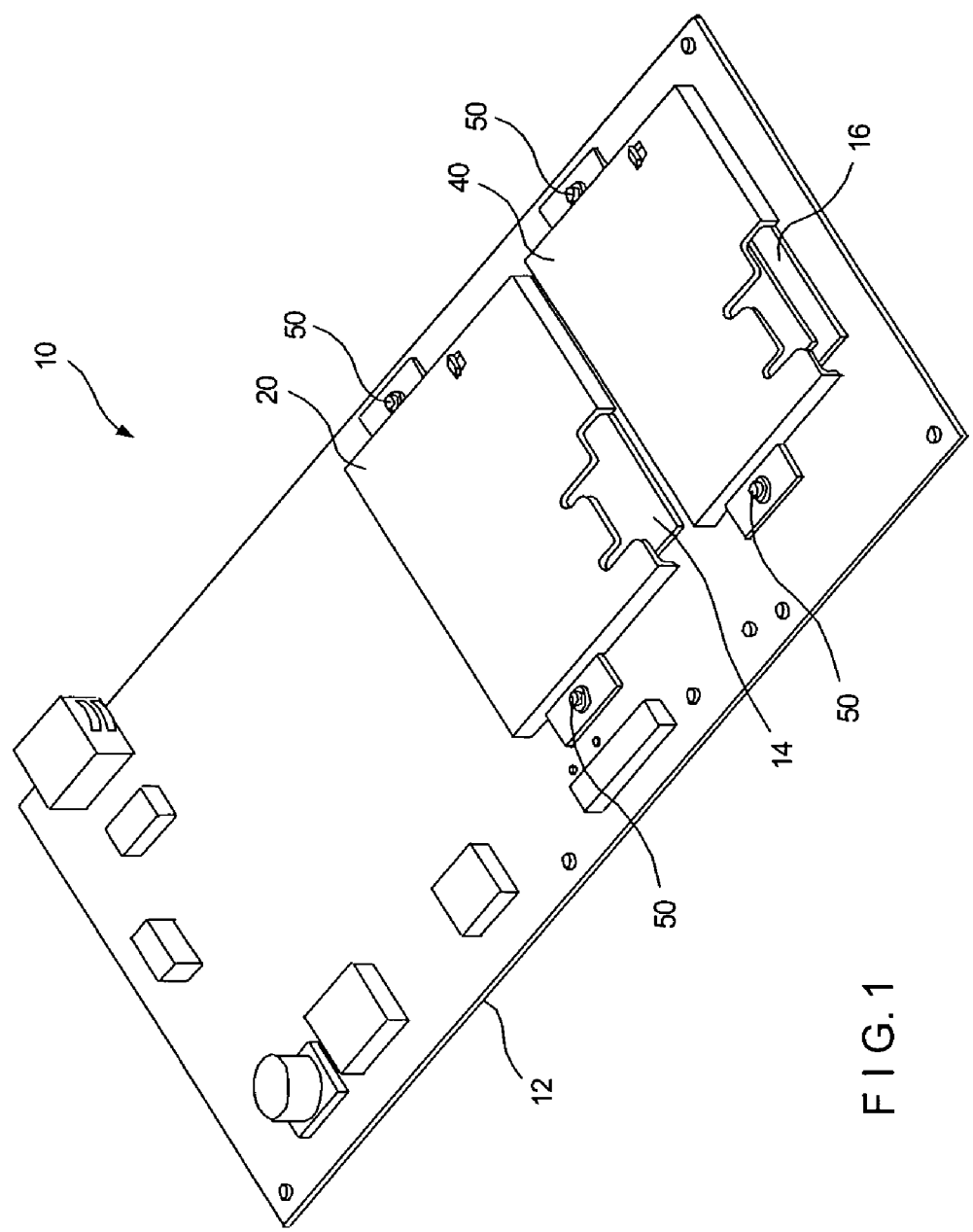
FIG. 1 shows an exemplary circuit assembly according to the present invention.

FIG. 1 shows an exemplary circuit assembly 10 according to the present invention. The exemplary circuit assembly 10 is described as being adapted for use with a device employing PCI or mini PCI cards. However, one of skill in the art will understand that the present invention may be useful for any device where components (or cards) with edge connectors are used. In a preferred embodiment, the circuit assembly 10 (e.g., wireless circuit assembly) is adapted for use in wireless networking devices employing at least one mini PCI radio card. For example, the circuit assembly 10 may be used in a desktop computer (e.g., personal computer), laptop computer, or personal data assistant ("PDA").

The circuit assembly 10 includes a circuit board 12 (e.g., printed circuit board ("PCB")), which may be of any shape, size, or design (e.g., form factor) known to those of skill in the art. As one of ordinary skill in the art will understand, the circuit board 12 may include any number and variety of circuit components (e.g., processors, memory, etc). The circuit components may attach on either surface of the circuit board 12 (e.g., top or bottom).

The circuit assembly 10 also includes at least one PCI card. The exemplary embodiment includes a first PCI card 14 and a second PCI card 16. The circuit board 12 also includes connectors (not shown) into which the PCI cards 14/16 are connected. As will be described in greater detail below, the connectors and a portion of the PCI cards 14/16 are not shown in FIG. 1 because apparatus 20/40, respectively, obscure the PCI cards and connectors. In the exemplary embodiment, at least one of the PCI cards 14/16 is a Mini PCI standard type III (e.g., IIIA or IIIB) radio card. For example, the PCI card 14/16 may be a radio card for wireless networking (e.g., Wi-Fi compatible). As one of ordinary skill in the art will understand, the PCI cards 14/16 may include connectors of any stack height.

Each PCI card 14/16 is secured to the connector of the circuit board 12 with an apparatus 20/40. The apparatus 20/40 (e.g., bracket or holder) may be constructed out of sheet metal, die-casting, plastic or any other suitable material known to those of skill in the art. The exemplary embodiments of the apparatus 20/40 include a substantially rectangular shape. However, the apparatus 20/40 may be of any other shape to accommodate other known PCI cards.

Figure 2:
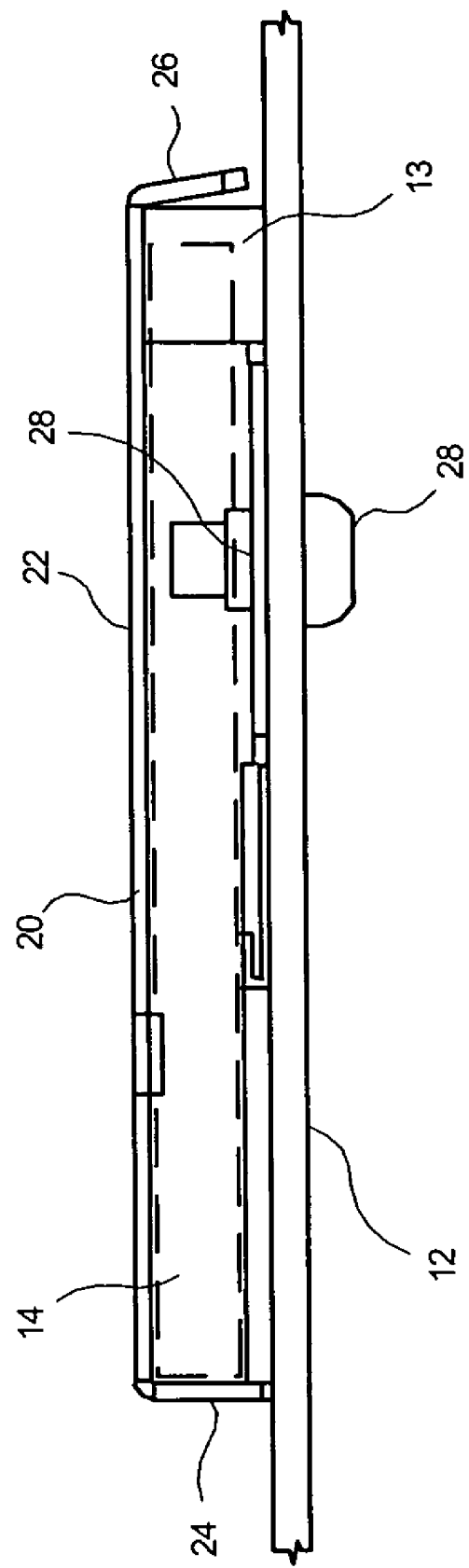
FIG. 2 shows a cross-sectional view of an exemplary apparatus according to the present invention.

FIG. 2 shows a cross-sectional view of the apparatus 20 according to the present invention mounted on the circuit board 12. The apparatus 20 may include a top portion 22, front portion 24, and a back portion 26. As shown in FIG. 1, the front portion 24 may be designed to contact less than the entire front edge of a PCI card (e.g., PCI card 14). As one of ordinary skill in the art will understand, this may allow for access to any connections (e.g., radio frequency ("RF") connections) on the PCI card 14.

The front portion 24 of the apparatus 20 preferably meets the top portion 22 at an angle substantially equal to ninety

(90) degrees. The front portion 24 may therefore be in close contact with a substantial portion of a front edge of the PCI card 14. The back portion 26 of the exemplary embodiment meets the top portion 22 at an angle greater than ninety degrees. The angled back portion 26 is in close contact with the PCI card 14, thereby providing a downward force and/or a sideways force on the PCI card 14 (e.g., in a direction towards the circuit board 12 and the edge connector 13) to secure the PCI card to an edge connector 13. The downward/sideways force may ensure good contact between the PCI card 14 and the connector 13 (e.g., a 124-pin connector) on the circuit board 12.

As shown in FIGS. 1–3C, each apparatus 20/40/60 according to the present invention may attach to the circuit board 12 via any number of fasteners 50. For example, the apparatus 20 shown in FIG. 2 may be secured to the circuit board 12 with at least one fastener 50 via a footing 28 in the apparatus 12. The fasteners 50 may be, for example, machine screws or any other fastener known to those of skill in the art. In some embodiments, the fasteners 50 are tamper-proof fasteners which prevents a user from tampering with the radio. Some jurisdictions (e.g., Japan) require such tamper-proofing to satisfy regulatory requirements.

Figures 3A, 3B, 3C:
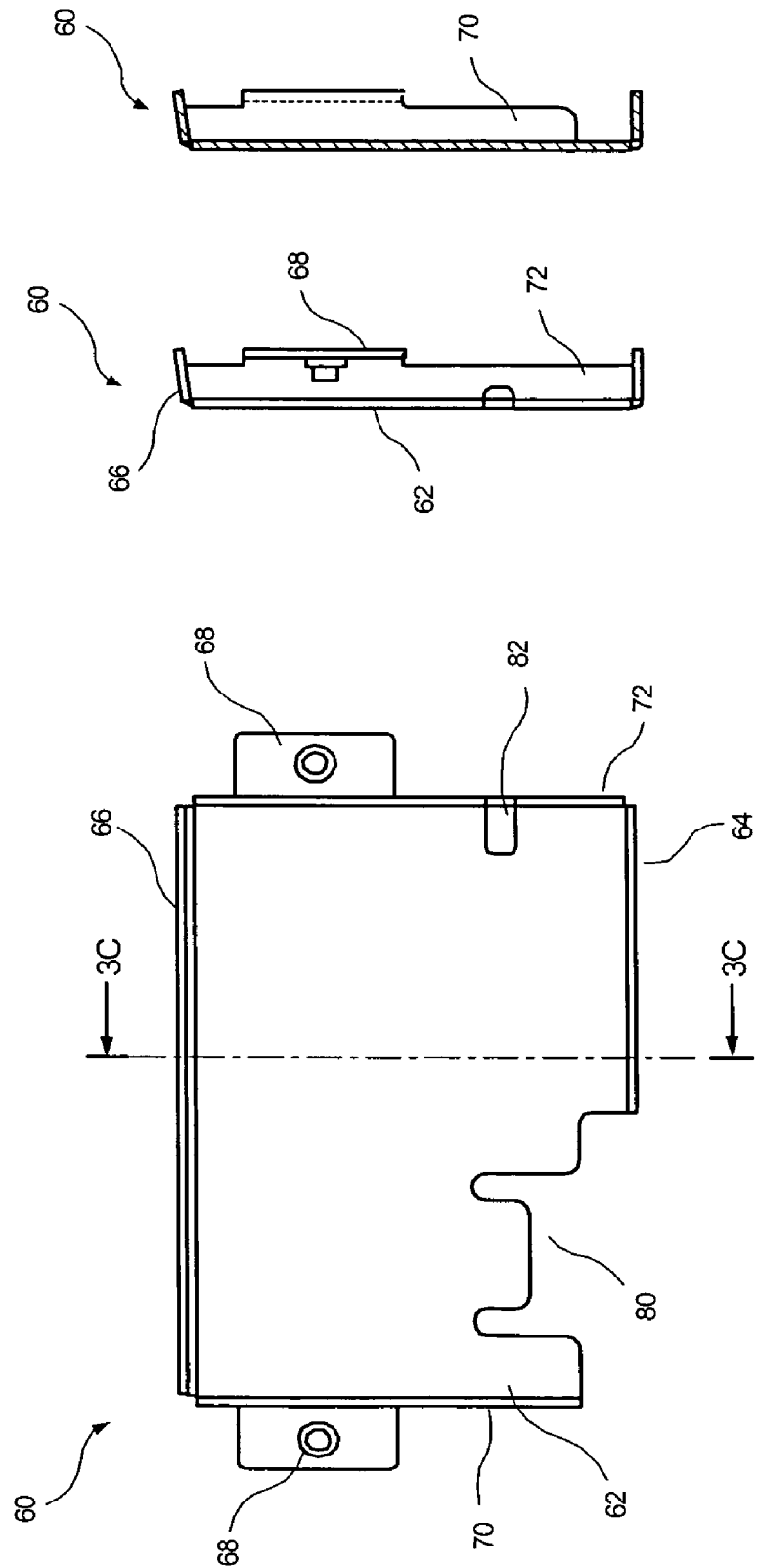
FIG. 3A shows a top view of another exemplary apparatus according to the present invention.
FIG. 3B shows a side view of the exemplary apparatus according to the present invention shown in FIG. 3A.
FIG. 3C shows a cross-sectional view of the exemplary apparatus according to the present invention shown in FIG. 3A.

FIGS. 3A–3C show another exemplary embodiment of an apparatus 60 according to the present invention. Approximate dimensions of the apparatus 60 are shown in millimeters. The apparatus 60 may be constructed out of sheet metal, die-casting, plastic or any other suitable material known to those of skill in the art. Preferably, the apparatus 60 is constructed with a tolerance stack of less than one (1) mm to ensure a snug fit over a PCI card.

The apparatus 60 includes a top portion 62, front portion 64, and a back portion 66. The apparatus 60 also includes one or more footings 68. The footings 68 may be designed for compatibility with any fastener (e.g., the fasteners 50) to secure the apparatus to a surface (e.g., a circuit board 12).

The apparatus 60 according to the present invention may include two side portions, e.g., a first side portion 68 and a second side portion 70. As one of ordinary skill in the art will understand, the side portions 68/70 may be non-critical portions. For example, a PCI card (e.g., PCI card 14/16) may be secured via substantially tight contact with the front portion 64 and the back portion 66. Thus, the side portions 68/70 may be in loose contact with the PCI card and providing nominal (e.g., non-critical) support.

The apparatus 60 may include any number of openings (e.g., opening 80 and opening 82). Openings or cut-outs may be included to provide access for RF or any other electrical connections to the PCI card (e.g., PCI card 14/16). However, a sufficient length of both the front portion 64 and the back portion 66 should remain to provide substantial contact with the PCI card.

In some embodiments of the present invention, a thermal interface material may be included between the apparatus 20/40/60 and a PCI card. As one of ordinary skill in the art will understand, the thermal interface material may act as a heat conducting path to the device which would then act as a heat sink to dissipate heat off the PCI card and/or any other components. The apparatus 20/40/60 may further include fins (not shown) to increase the surface area for heat dissipation. In some embodiments, the apparatus 20/40/60 is manufactured of an electromagnetic ("EM") shielding material to provide an EM shield for the PCI card and/or a material to provide protection against electrostatic discharge ("ESD") when grounded to a circuit board (e.g., circuit board 12).

The present invention may provide for the securing and protection of a PCI card in a wireless device. The present invention may be useful for improving durability in portable wireless devices. For example, the disclosed exemplary embodiments of the present invention may withstand approximately 0.04 $g^2$/Hz of random vibration in all three axises. The exemplary embodiments may also withstand at least a ninety-one (91) centimeter drop to a hard surface (e.g., concrete).

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A circuit assembly, comprising:
   a circuit board including a connector;
   a card connectable to the connector; and
   an apparatus securing the card to the connector, wherein the apparatus includes a front portion in substantially close contact with the card and a back portion in substantially close contact with the card, the apparatus being coupled to the circuit board, wherein the back portion meets a top portion of the apparatus at an angle greater than ninety degrees.

2. The circuit assembly according to claim 1, wherein the front portion meets a top portion of the apparatus at angle substantially equal to ninety degrees.

3. The circuit assembly according to claim 1, wherein the card is one of a PCI card and a mini PCI card.

4. The circuit assembly according to claim 1, wherein the card is a radio card.

5. The circuit assembly according to claim 1, wherein the connector is an edge connector.

6. The circuit assembly according to claim 5, wherein the connector is a 124-pin card edge connector.

7. The circuit assembly according to claim 1, further comprising:
   a thermal interface dissipating heat from the card and situated between the apparatus and the card.

8. The circuit assembly according to claim 1, wherein the apparatus further includes at least one footing.

9. The circuit assembly according to claim 1, further comprising:
   at least one fastener coupling the apparatus to the circuit board.

10. The circuit assembly according to claim 9, wherein the fastener is a tamperproof fastener.

11. The circuit assembly according to claim 9, wherein the fastener is a machine screw.

12. An apparatus, comprising:
    a top portion;
    a front portion meeting the top portion at an angle substantially equal to ninety degrees, the front portion coming in substantially close contact with a card; and
    a back portion meeting the top portion at an angle greater than ninety degrees, the back portion coming in sub stantially close contact with the card to secure the card to a connector.

13. The apparatus according to claim 12, wherein the apparatus is manufactured with one of sheet metal, die cast metal, and plastic.

14. The apparatus according to claim 12, further comprising:
an electromagnetic shielding material protecting the card against electrostatic discharge.

15. The apparatus according to claim 12, further comprising:
a thermal interface dissipating heat from the card and situated between the apparatus and the card.

16. The apparatus according to claim 12, further comprising:
at least one footing.

17. The apparatus according to claim 16, further comprising:
at least one fastener securing the apparatus via the footing.

18. The apparatus according to claim 17, wherein the fastener is a tamperproof fastener.

19. The apparatus according to claim 17, wherein the fastener is a machine screw.

* * * * *